Figure 1:
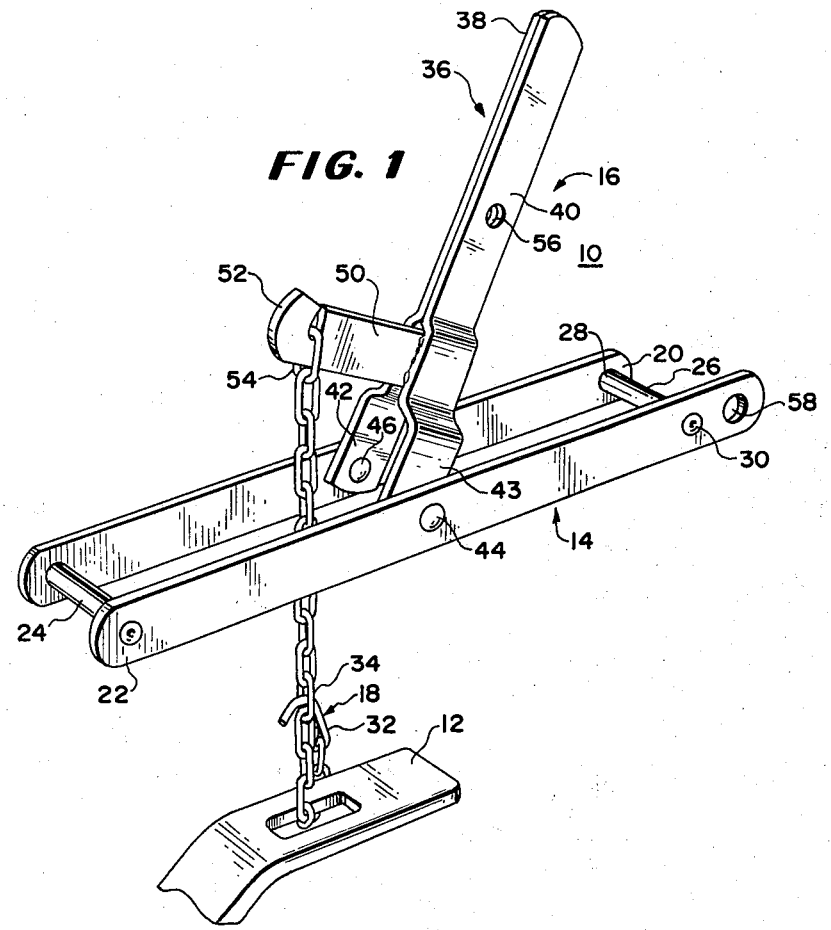

United States Patent [19]
Schnakenberg

[11] 3,823,858
[45] July 16, 1974

[54] SPARE TIRE CLAMP

[76] Inventor: Herbert E. Schnakenberg, 315 S. Boswell, Crete, Nebr. 68333

[22] Filed: May 29, 1973

[21] Appl. No.: 364,631

[52] U.S. Cl............................ 224/42.24, 224/42.25
[51] Int. Cl...................... B62d 43/02, B62d 43/08
[58] Field of Search........... 224/42.24, 42.26, 42.06, 224/42.12; 296/37.2; 254/78; 24/270, 271

[56] References Cited
UNITED STATES PATENTS

| | | | |
|---|---|---|---|
| 2,661,131 | 12/1953 | Roy................................ | 224/42.26 |
| 2,674,394 | 4/1954 | Hall et al......................... | 224/42.24 |
| 3,081,924 | 3/1963 | Merbler et al.................... | 224/42.24 |

Primary Examiner—Robert J. Spar
Assistant Examiner—Jerold M. Forsberg
Attorney, Agent, or Firm—Vincent L. Carney

[57] ABSTRACT

To clamp a spare tire in place within the trunk of an automobile, a clamp includes two flat metal base struts held in parallel spaced-apart relation to each other by tubular spacers and rivets, with the edges of the struts being adapted to rest against the top of the tire over its central opening. The bifurcated end of a handle formed from two flat metal stampings fastened together at one end and spread apart at the other is pivoted at a central point on the base struts to:

1. lift the upper end of an upstanding arm fastened between the stampings where the bifurcated sections come together when the handle is pivoted downwardly to tighten a chain connected between the end of the arm and a bracket beneath the tire; and
2. lower the arm when the handle is raised so as to loosen the chain. The clamp is sufficiently narrow to pass through the center of the tire when the tire is being removed or placed into the trunk.

9 Claims, 2 Drawing Figures

PATENTED JUL 16 1974 3,823,858

SPARE TIRE CLAMP

This invention relates to tire clamps for holding spare tires to vehicles.

Generally, spare tires are held within the trunk of an automobile by a hook shaped fastener having a threaded end so that the hook engages a bracket or other structure in the automobile body beneath the tire and the threaded end passes through the center of the tire and the base of the automobile jack, with a wing nut being threaded on the end to hold the tire between the base of the jack and the bottom of the trunk.

The prior art devices for holding spare tires in place have several disadvantages, such as: (1) they include separatable parts which may easily be lost; (2) they require the use of the base of the automobile jack so that the tire must be loosened when the jack is to be used; (3) it is relatively time consuming to loosen or tighten a tire with them because they must be inserted into a bracket in the bottom of the trunk and a wing nut must be threaded onto a stem or from a stem; and (4) under some circumstances they do not provide firm clamping action.

Other types of clamps have been proposed, but these clamps have generally had some deficiency. A common deficiency is that they are excessively expensive.

Accordingly, it is an object of the invention to provide a novel holding apparatus for spare tires.

It is a further object of the invention to provide a novel tire clamp.

It is a still further object of the invention to provide a clamp that is made entirely of inexpensive parts such as metal stampings, chains and rivets.

It is a still further object of the invention to provide a tire clamp that is easily used and provides firm clamping action.

It is a still further object of the invention to provide a tire clamp which remains affixed to an automobile at all times once installed.

In accordance with the above and further objects of the invention, a tire clamp includes a base, a clamping lever, and a chain.

To support the tire clamp upon a tire over the central opening therein, the base of the clamp includes two flat elongated base struts separated from each other in parallell relationship by spacers, with the flat surfaces of the struts facing each other and the lower edges being adapted to rest upon the tire. One of the struts is longer than the other and includes an aperture on one end to accommodate a padlock.

To hold the tire between the tire clamp and the frame of the automobile, a chain is connected at one end to a hook and looped around a bracket at the bottom of the trunk of the automobile with the hook being fastened to a link and is connected at its other end to an arm on the clamping lever so that the chain holds the tire between the bottom of the trunk of the car and the clamp.

The clamping lever includes a handle formed of two elongated metal stampings fastened together at one end and spread apart at the other to form a yoke, the ends of which are pivotally fastened against the inner surfaces of the strut at a central location on the base to permit the handle to pivot upwardly and downwardly. The chain holding arm extends orthogonally to the handle and is fastened at the junction of the bifurcated sections, with the chain being fastened to its outer end so that the end of the chain is raised farther above the base as the handle is pulled downwardly and moved further toward the base as the handle is lifted upwardly. The chain and arm move to the handle side of the pivot pins for clamping action when the handle is moved downwardly.

The clamp is fitted to a particular model car and is thereafter used to clamp a tire in place by pulling the handle downwardly against the base and to release the tire by lifting the handle upwardly.

To fit the clamp to a particular model car, the chain is passed between the base struts of the clamp through the central opening in a tire and looped around the bracket in the bottom of the trunk, with the hook on the end of the chain engaging a selected link in the chain. The handle is then pulled downwardly with the base resting across the opening to see if proper clamping action takes place. If the tension on the chain pulls the arm as it passes over the pivot points of the handle to force the handle downwardly and hold the tire firmly, the hook is tightened on the link wherein the clamp is properly fastened. If the chain is too loose, the hook is moved to a link closer to the arm and if it is too tight it is moved to a link further from the arm and the procedure is repeated until a proper fit is found.

To clamp a tire in place, the tire is placed in the spare tire compartment and the clamp is pulled upwardly through the central opening in the tire. When the clamp is above the tire with its handle pivoted upwardly so the chain is loose, the base struts are placed across the central opening so that the clamp rests upon the top of the tire. The handle is now moved downwardly so that the arm moves over the pivot points of the handle and the tension on the chain pulls it down, with the tire being held by the chain firmly between the clamp and the bottom of the trunk. The handle may now be locked in place by passing a padlock through the aperture in one of the base struts and around the handle and locking the padlock.

To remove a tire, the handle is pulled upwardly so that the chain is loosened. The clamp is now passed in direction of its longitudinal axis through the central opening in the tire so that the tire may be lifted from the trunk.

The tire clamp of this invention has several advantages, such as: (1) none of its parts are separatable from the automobile and therefore they can not be lost; (2) it does not require the base of the jack so that the jack may be used without loosening the tire; (3) it provides firm clamping action; (4) a tire may be quickly and easily clamped or unclamped; and (5) the clamp is relatively inexpensive.

Figure 2:
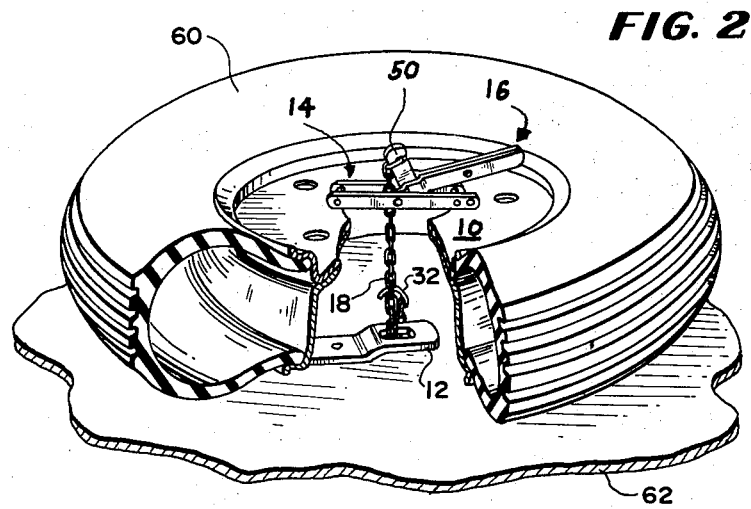

The above and further features of the invention will be better understood from the following detailed description when considered with reference to the accompanying drawings in which:

FIG. 1 is a perspective view of a clamp in accordance with an embodiment of the invention; and FIG. 2 is a perspective view of the clamp and a tire illustrating the manner in which the clamp holds a spare tire in a trunk compartment, with a portion of the tire being broken away to show the chain of the clamp in accordance with an embodiment of the invention.

In FIG. 1 there is shown a clamp 10 cooperating with a bracket 12 to hold a spare tire for an automobile (not shown in FIG. 1) in the trunk of the automobile with the bracket 12 being fastened to the car body within the trunk and the clamp 10 being on the other side of the tire.

While a bracket 12 is shown in FIG. 1, this bracket is intended to represent any standard equipment provided in vehicles to enable the ready attachment of a spare tire by a holding device. Generally, it is only necessary for it to be securely fastened to the body of the vehicle and to have an opening through which a chain may pass.

The clamp 10 includes a base 14, a clamping lever 16 and a chain 18.

To support the clamping lever 16 and chain 18, the base 14 includes two flat, parallel elongated base struts 20 and 22 held by rivets in spaced-apart relationship on opposite ends of two parallel tubular spacers 24 and 26, with the two base struts 20 and 22 having flat surfaces facing each other and the tubular spacers 24 and 26 being positioned at spaced apart distances from each other between the struts.

To apply tension between the bracket 12 that is attached to the automobile body and the surface of the tire to hold the tire in place, the chain 18 includes a hook 32 at one end arranged to be looped around the bracket 12 and fastened to any one of a plurality of chain links such as the chain link shown at 34 in FIG. 1. The opposite end of the chain 18 is fastened to the clamping lever 16 so that it may be pulled tightly by operation of the clamping lever 16.

To tighten the chain 18 and hold the tire in place, the clamping lever 16 includes a handle 36 and an arm 50, with the handle 36 being formed of two metal stampings 38 and 40 abutting each other on a first end and being spread apart on the other end to contact the inner surfaces of the base struts 20 and 22 on which they are pivoted by pivot pins 44 and 46, the arm 50 being welded at the beginning of the bifurcated section between the bifurcated ends 43 to extend orthogonally therefrom.

The arm 50 is fastened to a link 54 of the chain 18 at 52. In the preferred embodiment, the arm 50 is a metal stamping having a notch cut therein to receive the link 54, with the notch being closed upon the link to hold it. However, the link 54 may be connected in any other manner, such as by welding.

The metal stampings 38 and 40 forming the handle 36 may be welded together or riveted such as at 56. The end of the strut 22 extends beyond the strut 20 in the same direction as the handle 36 when the clamp is tightened beyond the strut 20 and includes an aperture 58. The aperture 58 is sufficiently large to receive a padlock which extends around handle 36. With this mechanization the handle 36 may be locked in its clamped position so as to prevent unauthorized removal of the spare tire.

The base struts 20, 22, the arm 50 and the two parts 38 and 40 of the handle 36 are metal stampings, with the struts 20 and 22 being spaced from each other by tubular spacers. Accordingly, clamp 10 is very economical, being fabricated entirely of metal stampings, rivets, tubes and a chain.

The arm 50 is sufficiently long and positioned with respect to the rivets 44 and 46 about which the lever 16 pivots to tighten the chain 18 and to hold a tire in place by toggle action as the arm 50 passes beyond the pivot points of the clamping lever 16. When the clamping lever 16 is in its lowermost position where it rests against the spacer 26, the chain 18 passes between the bifurcated end of the clamping lever 16 and exerts a force that holds the clamp in its closed position with substantial force.

Before being used, the clamp 10 must be fitted for the model automobile in which it is to hold the spare tire. To fit the clamp to the automobile, the chain 18 (FIG. 2) is dropped through a tire 60 in the trunk of the automobile and looped around the bracket 12. The hook 32 is fastened to a link of the chain and the clamp is positioned with the edges of its struts 20 and 22 resting against the wheel and the arm 50 extending upwardly therefrom. The clamping lever 16 is then moved downwardly until the handle 36 abuts the spacer 26.

If during this fitting, the clamping lever 16 does not snap in place with the chain 18 being taut, the handle 36 is lifted upwardly to loosen the chain and the hook 32 is moved to a new link to tighten or loosen the chain as may be required. This procedure is repeated until, when the handle 36 is moved downwardly, it snaps into place as the connection 52 to the arm 50 passes over the pivots 44 and 46 to hold the tire 60 tightly in place between the clamp 10 and the bracket 12 in the trunk of the automobile. Once the proper link of the chain is determined, the hook 32 is bent to close it upon the selected link and the clamp 10 remains with the automobile at all times whether the spare tire 60 is removed or not.

To loosen and remove a tire 60 from the trunk 62 of the automobile, the handle 36 is lifted upwardly, permitting the arm 50 to move in the direction of the spacer 24, until the connecting point 52 passes over the pivot points 44 and 46. At this time the clamp snaps open, with the chain 18 becoming loose. With the chain loose, the clamp 10 is lifted upwardly and turned so that the struts 20 and 22 point at the opening in the center of the tire 60. It is then lowered through this opening and the tire 60 lifted from its location.

To replace and clamp a tire 60 in the trunk of an automobile, the tire is placed in the trunk over the bracket 12 and the clamp 10 is pulled through the center of the tire. The clamp is then turned so that the handle 36 points upward, the base struts 20 and 22 rest across the opening in the tire and the chain passes between the base struts 20 and 22 and the bifurcated portions of the clamping lever 16.

To hold the tire firmly in place, the handle 36 is moved downwardly against the spacer 26. As the handle 36 moves downwardly, the arm 50 moves up until the connecting point 52 passes over the pivot pins 44 and 46, at which time the tension on the chain 18 pulls the arm 50 downwardly in the direction of the spacer 26 to tightly close the clamp, with the tire 60 being held firmly between the clamp 10 and the bracket 12 by the chain 18. The clamp may now be locked in its closed position by passing a padlock through the aperture 58 and around the handle 36 and locking the padlock.

From the above description it can be understood, that the clamp 10 has several advantages such as: (1) it always remains fastened to the vehicle and in one piece so that neither it nor any part of it is likely to be lost; (2) it permits tires to be rapidly removed and clamped in place; (3) it is relatively inexpensive and simple in its construction; (4) it does not require the base of the jack so that the jack may be used without loosening the tire; and (5) it provides firm clamping action.

Although a preferred embodiment of the invention has been described with some particularity, many modifications and variations in the preferred embodiment are possible in the light of the above teachings without deviating from the invention. Therefore, it is to be understood that, within the scope of the appended claims, the invention may be practiced otherwise than as specifically described.

What is claimed is:

1. A clamp for holding a spare tire having a central aperture to a supporting surface on a vehicle comprising:
    a first elongated base member;
    a second elongated base member;
    said first and second elongated base members being spaced from each other;
    an elongated flexible fastening means;
    an elongated handle;
    one end of said elongated handle being bifurcated to form first and second ends;
    pivoting means for pivotally mounting said first end to said first elongated base member and said second end to said second elongated base member, whereby said handle pivots with respect to said first and second elongated base members in a plane passing between said first and second elongated base members;
    support means for holding one end of said elongated flexible fastening means in a fixed position with respect to said handle offset from the longitudinal axis of said handle which position causes a triangle to be formed of lines connecting said fixed position and said bifurcated ends so that said elongated flexible fastening means passes through said triangle as said handle is pivoted, whereby said handle is pulled downwardly toward said elongated base members by said elongated flexible fastening means when said elongated flexible fastening means moves through said triangle in the direction of said handle, so that said spare tire is held in place with said first and second elongated base members spanning said aperture with said flexible fastening means passing through said aperture and being fastened to said supporting surface.

2. A clamp according to claim 1 in which said elongated handle includes two flat metal stampings and means for holding said flat metal stampings together over a portion of their lengths.

3. A clamp according to claim 2 in which said support means includes a metal stamping fastened at one end to said handle and extending transversely therefrom.

4. A clamp according to claim 3 in which said first and second elongated base members are each longer than the diameter of the aperture in the center of a standard tire and the height of said clamp from the bottom of said base to the top of said support means when said support means is closest to said base is shorter than said diameter.

5. A clamp according to claim 1 in which said first and second elongated base members are each longer than the diameter of the aperture in the center of a standard tire and the height of said clamp from the bottom of said base to the top of said support means when said support means is closest to said base is shorter than said diameter.

6. A clamp according to claim 5 in which said flexible fastening means is a chain and includes a hook on its end.

7. A clamp according to claim 6 in which said support means includes a metal stamping fastened at one end to said handle and extending transversely therefrom, said chain being fastened to said opposite end of said stamping.

8. A clamp according to claim 7 in which one of said first and second elongated base members includes an aperture.

9. A clamp according to claim 1 in which said support means includes a metal stamping fastened at one end to said handle and extending transversely therefrom, said elongated flexible fastening means being fastened to the other end of said stamping.

* * * * *